Figure 1:
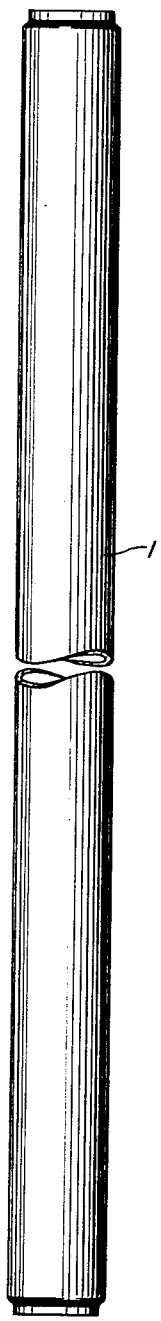

Oct. 31, 1961     W. C. MARTYNY     3,006,781
PHOSPHOR COATING METHOD
Filed March 7, 1960

Inventor:
William C. Martyny,
by *Emmet W. Logue*
His Attorney.

3,006,781
PHOSPHOR COATING METHOD
William C. Martyny, Lyndhurst, Ohio, assignor to General Electric Company, a corporation of New York
Filed Mar. 7, 1960, Ser. No. 12,969
5 Claims. (Cl. 117—33.5)

This invention relates to a process for coating luminescent materials on vitreous surfaces and particularly on the internal surface of fluorescent lamp envelopes. The present invention is an improvement over the phosphor coating process described in my co-pending application, Treatment of Luminescent Materials, Serial No. 625,942, filed December 3, 1956, now Patent No. 2,851,552, and assigned to the same assignee as the present invention.

Fluorescent lamps are usually coated by forming a suspension of a fine luminescent material or phosphor in a suitable binder which is introduced into the interior of the tube or lamp envelope to be coated. In downflush coating, the suspension is introduced from the top and flows down. The excess is allowed to drain, the coating dried by passing a current of warm air through it, and the tube is then heated in an oxidizing atmosphere to decompose or oxidize and drive off the binder material.

The production of a smooth coating free of streaks or drapes and pinholes and relatively uniform in thickness from end to end, that is without excessively thin top ends or thick lower ends, is a rather critical operation even in a lamp envelope which is symmetrical in cross section, that is a round tube fluorescent lamp. It presents a greater problem when it is desired to coat a tube which is non-symmetrical in cross section such as a configurated tube having short re-entrant sections or grooves extending longitudinally and alternating from side to side. An example of such a tube is the highly loaded fluorescent lamp sold by applicant's assignee under the designation "Power Groove."

Accordingly the object of the invention is to provide a new and improved method of coating fluorescent lamps with luminescent material and which is particularly suitable for phosphors which have been milled and processed in aqueous dispersions.

A further object of the invention is to provide a process for coating phosphors on fluorescent lamps which is readily adaptable to lamps of various cross section or contour by suitable modification of the relative proportions of the constituents.

In accordance with the invention, I have found that the coating characteristics of a suspension of phosphor in an ammoniacal aqueous solution having as main ingredients the copolymer of methyl vinyl ether and maleic anhydride, and the polymer of acrylic acid can be adjusted to make it suitable for coating practically any lamp envelope by varying the proportions of the two main ingredients.

The following flow diagram, which is specific to the coating of a configurated glass lamp envelope of irregular cross section, typically illustrates the process in accordance with the invention.

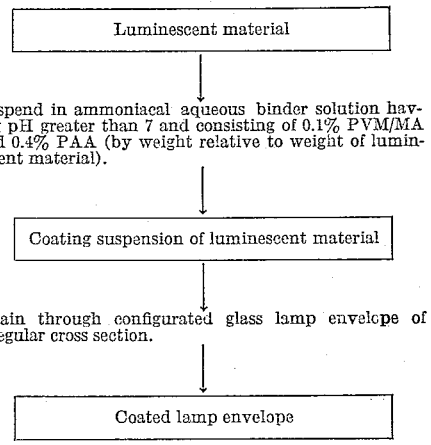

Figure 2:
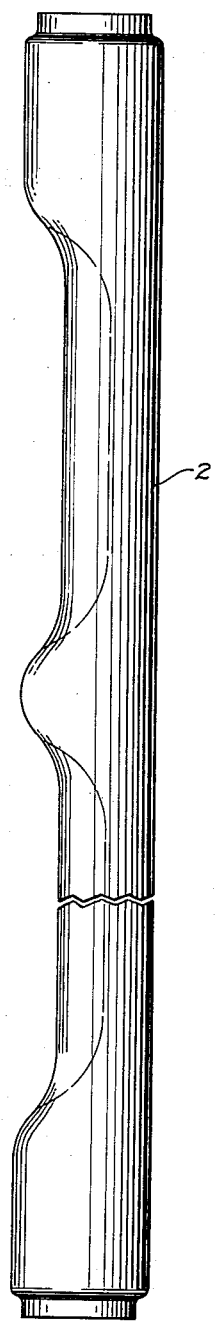

The drawing illustrates typical fluorescent lamps to the coating of which the invention is particularly directed. FIG. 1 illustrates an ordinary round tube fluorescent lamp envelope. FIG. 2 illustrates a configurated envelope for a high-loading fluorescent lamp provided with interrupted re-entrant groove portions extending longitudinally along one side.

The first ingredient of the improved binder solution and consisting of the copolymer of methyl vinyl ether and maleic anhydride (henceforth abbreviated PVM/MA) is an excellent dispersant for phosphor systems, as previously known from my above-mentioned co-pending application. It has Newtonian flow characteristics, that is, it flows quite readily and levels off quickly to produce a uniform film of reasonable strength. Also it has good stability to shear, a necessary characteristic if the material is to retain its viscosity in the high speed pumping systems of the lamp coating equipment in general use.

An aqueous solution of PVM/MA will suspend a phosphor in a completely dispersed system and can be used to provide an acceptable coating in a circular-section tube. However the adjustment of air flow through the tube to assure such results is somewhat critical. Furthermore there is a tendency to leave undesirable alternately heavy and light stripes or bands of phosphor around the inside surface of the tube and extending longitudinally. The reason for this is that in spite of the apparent uniformity of a circular section tube, the inside surface is not perfectly round but is variable in curvature and contains shallow channels. Due to the Newtonian flow characteristic of the PVM/MA suspension, the coating continues to flow until the water is completely evaporated. This continuing flow allows the phosphor to flow off the lesser curvature portions of the tube surface and to concentrate in the higher curvature portions or channels so that the phosphor tends to form streaks as it dries. Furthermore, a phosphor suspension in PVM/MA alone is unsuitable for coating non-circular section or configurated lamp envelopes and produces excessive variations in thickness of coating over the indentations.

The second ingredient in the binder solution according to the invention is high purity polyacrylic acid (henceforth abbreviated PAA). PAA has characteristics quite different from those of PVM/MA and will not of itself provide an acceptable binder solution because it does not disperse the phosphor sufficiently to produce a satisfactory coating. However it has thixotropic flow characteristics, that is, the material tends to gel and set rapidly as the coating thins down and the rate of flow decreases. PAA has a very high film strength and will bind the phosphor tenaciously to the bulb wall during flow off. The material has excellent stability making it suitable for use in high speed pumping system. In addition, it has a very high specific viscosity permitting the use of a relatively small amount and thereby facilitating the lehring operation during which the binder must be driven off.

The following example will illustrate the preparation of a coating suspension in accordance with the invention. PVM/MA is dissolved in hot deionized water and the solution is then brought to a pH greater than 7 by adding ammonium hydroxide, thereby in effect forming the ammonium salt of PVM/MA. The powdered luminescent material or phosphor is then added to this solution and suspended in it by means of ball-milling or high shear mixing to provide a completely dispersed suspension. The PAA may be a solid but is commonly received from the manufacturers as a very viscous liquid. The PAA solution is prepared by dissolving the solid or diluting the very viscous PAA in water and adding enough ammonium hydroxide to raise the pH value to above 7. The PAA solution is then added to the PVM/MA phosphor suspension in a suitable ratio for producing the desired flow characteristics depending upon the nature of the tube desired to be coated.

For coating fluorescent lamps with the usual phosphor thickness, I have determined that the binder solution should contain in the range of 0.3% to 0.8% by weight of binder solids to phosphor solids, the binder solids including both PVM/MA and PAA. The quantity of PVM/MA may be computed on the basis of a 1% aqueous ammoniacal solution measured at pH 9 to provide a viscosity between 50 and 300 centipoises. The quantity of PAA may likewise be computed on the basis of a 1% aqueous ammoniacal solution measured at pH 9 to provide a viscosity between 500 and 1500 centipoises, usually about 1100 centipoises. Within the stated 0.3% to 0.8% range, the proportion of PAA to total binder, that is to PVM/MA plus PAA, may be relatively low for coating tubes or bulbs of uniform cross section, for instance 25%. On the other hand, for coating tubes of irregular or noncircular cross section, the proportion of PAA to total binder should be increased, for instance to as much as 90% for coating highly irregular tubes.

As an example of the foregoing, for coating the tube of a 40-watt fluorescent lamp 1 of circular cross section as illustrated in FIG. 1, the binder solution may contain 0.3% by weight of PVM/MA relative to phosphor and 0.2% by weight of PAA relative to phosphor, the proportion of PAA to total binder being 40%. With these proportions, the binder suspension will flow evenly and provide a smooth coating free of cord streaks despite the presence of circumferential unequalities and longitudinal channels in the internal surface of the tube.

As a further example, in the case of a noncircular section Power Groove tube 2, as illustrated in FIG. 2, the binder solution may contain 0.1% by weight of PVM/MA relative to phosphor and 0.4% by weight PAA relative to phosphor. The proportion of PAA to total binder in this example is 80%. It will be appreciated that the problem of coating a configurated tube such as that of a Power Groove lamp presents an extreme variety of conditions. Along the circular sections of the tube, the flow of coating is much like that in any circular section tube and is quite rapid by reason of the absence of indentations. Also the suspension has the shortest distance to travel for a given vertical or axial distance along the tube. However along the portions of the tube where the indentations are located, the flow takes place in several different directions. Some of the suspension flows over the indentations and such flow is quite slow because it is in substantial part horizontal. The suspension which follows this path must travel a distance approximately 30% greater than the equivalent axial distance. Below each indentation or groove length, the flow of suspension must revert back towards the circular wall or side of the tube. To compound the problem further, the amount of suspension flowing over the indentations diminishes as the suspension flows down the tube due to the tendency of the flow to concentrate at the circular side walls of the tube.

In view of the many factors which operate against achieving a uniform coating in a configurated tube, it is surprising that by a simple adjustment of the ratio of PVM/MA to PAA in the binder solution, a satisfactory coating may be achieved. The explanation appears to be that the PVM/MA component, by reason of its Newtonian flow characteristics, allows the coating suspension to run off sufficiently in the long draining areas of the tube to give a uniform phosphor thickness. At the same time, the thixotropic flow characteristics of the PAA ingredient set or gel the coating after the flow rate has diminished to a certain value, and its high film strength holds the phosphor suspended in the areas where the flow has stopped. The yield or setting point of the phosphor suspension is determined by the ratio of PVM/MA to PAA. Thus, by adjusting the ratio of PVM/MA to PAA and also by controlling the weight of binder relative to weight of phosphor, a satisfactory coating can be achieved despite the extremely configurated nature of the tube desired to be coated.

The foregoing examples and specific details of the coating process in accordance with the invention are intended as illustrative and not as limitative of the invention. The scope of the invention is to be determined by the appended claims.

What I claim as new and desire to secure by Letters Patent of the United States is:

1. The method of coating a glass lamp envelope with a luminescent material which comprises suspending the luminescent material in an ammoniacal aqueous binder solution consisting of 0.3% to 0.8% by weight of binder solids to weight of luminescent material and wherein the binder solids consist of the copolymer of methyl vinyl ether and maleic anhydride and of polyacrylic acid, the proportion of polyacrylic acid to total binder solids being increased in accordance with the degree of irregularity of the envelope, and allowing the suspension to drain through the envelope.

2. The method of coating a glass lamp envelope with a luminescent material which comprises suspending the luminescent material in an ammoniacal aqueous binder solution consisting of 0.3% to 0.8% by weight of binder solids to weight of luminescent material and wherein the binder solids consist of the copolymer of methyl vinyl ether and maleic anhydride and of polyacrylic acid, the proportion of polyacrylic acid to total binder solids being in the range of 25% to 90%, and allowing the suspension to drain through the envelope.

3. The method of coating a glass lamp envelope with a luminescent material which comprises suspending the luminescent material in an ammoniacal aqueous binder solution consisting of 0.3% to 0.8% by weight of binder solids to weight of luminescent material and wherein the binder solids consist of the copolymer of methyl vinyl ether and maleic anhydride and of polyacrylic acid, the proportion of polyacrylic acid to total binder solids being in the range of 25% to 90% and being increased in accordance with the degree of irregularity of the envelope, and allowing the suspension to drain through the envelope.

4. The method of coating a glass lamp envelope of substantially circular cross section with a luminescent material which comprises suspending the luminescent material in an ammoniacal aqueous binder solution having a pH greater than 7 and consisting of about 0.3% by weight of the copolymer of methyl vinyl ether and maleic anhydride to weight of luminescent material, and about 0.2% by weight of polyacrylic acid to weight of luminescent material, and allowing the suspension to drain through the envelope.

5. The method of coating a configurated glass lamp envelope of irregular cross section with a luminescent material which comprises suspending the luminescent material in an ammoniacal aqueous binder solution having a pH greater than 7 and consisting of about 0.1% by weight of the copolymer of methyl vinyl ether and maleic anhydride to weight of luminescent material, and about 0.4% by weight of polyacrylic acid to weight of luminescent material, and allowing the suspension to drain through the envelope.

References Cited in the file of this patent

UNITED STATES PATENTS

| | | |
|---|---|---|
| 2,297,048 | Britten | Sept. 29, 1942 |
| 2,312,229 | Anderson | Feb. 23, 1943 |
| 2,421,979 | Backman | June 10, 1947 |
| 2,616,816 | De Gies et al. | Nov. 4, 1952 |
| 2,625,493 | Sadowsky | Jan. 13, 1953 |
| 2,756,163 | Herrick | July 24, 1956 |
| 2,955,958 | Brown | Oct. 11, 1960 |

UNITED STATES PATENT OFFICE
CERTIFICATE OF CORRECTION

Patent No. 3,006,781            October 31, 1961

William C. Martyny

It is hereby certified that error appears in the above numbered patent requiring correction and that the said Letters Patent should read as corrected below.

Column 1, line 14, for "Patent No. 2,851,552" read -- Patent No. 2,987,414 --.

Signed and sealed this 26th day of January 1965.

(SEAL)
Attest:

ERNEST W. SWIDER
Attesting Officer

EDWARD J. BRENNER
Commissioner of Patents